(12) United States Patent
Scodary et al.

(10) Patent No.: US 10,770,059 B2
(45) Date of Patent: Sep. 8, 2020

(54) CONVERSATIONAL SPEECH AGENT

(71) Applicant: Gridspace Inc., Menlo Park, CA (US)

(72) Inventors: Anthony Scodary, Los Angeles, CA (US); Alex Barron, Beverly Hills, CA (US); David Cohen, Redmond, WA (US); Evan MacMillan, San Francisco, CA (US)

(73) Assignee: Gridspace Inc., Menlo Park, CA (US)

( * ) Notice: Subject to any disclaimer, the term of this patent is extended or adjusted under 35 U.S.C. 154(b) by 9 days.

(21) Appl. No.: 15/929,095

(22) Filed: Jan. 29, 2019

(65) Prior Publication Data

US 2020/0243062 A1 Jul. 30, 2020

(51) Int. Cl.

| G10L 13/02 | (2013.01) |
| G10L 15/26 | (2006.01) |
| G10L 15/18 | (2013.01) |
| G10L 15/20 | (2006.01) |
| G10L 15/22 | (2006.01) |

(52) U.S. Cl.
CPC .............. *G10L 13/02* (2013.01); *G10L 15/18* (2013.01); *G10L 15/20* (2013.01); *G10L 15/22* (2013.01); *G10L 15/26* (2013.01); *G10L 2015/226* (2013.01)

(58) Field of Classification Search
CPC ...................................................... G10L 15/22
See application file for complete search history.

(56) References Cited

U.S. PATENT DOCUMENTS

| 6,018,711 A * | 1/2000 | French-St. George ...................... G10L 15/22 455/231 |
| 9,865,260 B1 * | 1/2018 | Vuskovic .............. G10L 15/222 |
| 10,475,451 B1 * | 11/2019 | Lynch ................. G10L 15/1815 |
| 2018/0012595 A1 * | 1/2018 | Weingartner ....... H04L 12/2816 |
| 2019/0013017 A1 * | 1/2019 | Kang ...................... G06F 40/35 |
| 2019/0103099 A1 * | 4/2019 | Panainte ................. G10L 15/22 |
| 2019/0115027 A1 * | 4/2019 | Shah ....................... G10L 15/16 |
| 2019/0147859 A1 * | 5/2019 | Zu ......................... G10L 13/043 715/203 |
| 2019/0304440 A1 * | 10/2019 | Yan ......................... G06F 40/35 |
| 2020/0013401 A1 * | 1/2020 | Saito ...................... G06F 3/013 |

* cited by examiner

*Primary Examiner* — Douglas Godbold
(74) *Attorney, Agent, or Firm* — Rowan TELS LLC

(57) ABSTRACT

A method of operating a speech synthesizing conversation agent involves operating an audio interface to receive caller audio signal during a call session. The method generates an audio transcript from the caller audio signal through operation of a sentiment analysis engine configured by a sentiment model. The method communicates the audio transcript to a user interface switch. The method operates the speech synthesizer engine. The speech synthesizer engine generates a response signal for the caller audio signal and the audio transcript through operation of response logic engine configured by the historical conversation data. The speech synthesizer engine generates a synthesized audio response with ambient signal and a synthesized user model response from the response signal through operation of a speech synthesis model configured by the historical conversation data. The method communicates the synthesized audio response to the caller audio signal through the audio interface during the call session.

12 Claims, 14 Drawing Sheets

CONVERSATIONAL SPEECH AGENT

BACKGROUND

Many service interactions that rely on audio communication between a caller and a service agent/representative may benefit from the use of automated agents (i.e., bots). While automated agents are able to handle menial tasks such as collecting formulary data from the caller (e.g., address, phone number, account number, etc.,), they are unable to handle more complicated tasks such as responding to questions or engaging in conversations. Many individuals find conversing with an automated agent to be off putting and being forced to interact with these systems may negatively influence the emotional state of the individual. As a solution some have suggested using a bot that is able to synthesize human speech. While this is a possibility, current speech synthesize systems exploit ontologies built with large amounts of hand tuning and design that make it difficult to account for more complex conversations. While these systems seem very robust, they are limited in depth. Therefore a need exists for improvements to automated agents.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
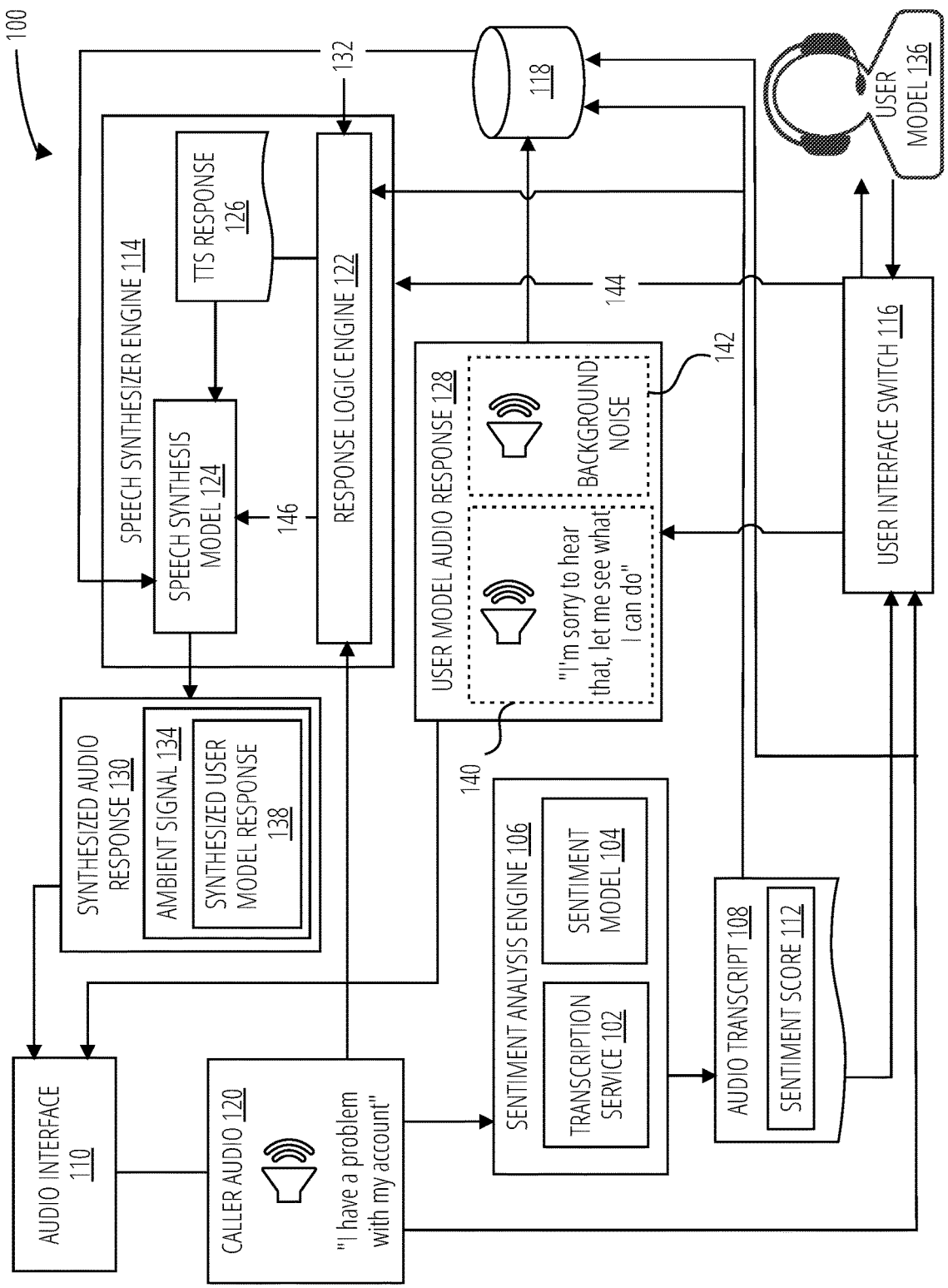
FIG. 1 illustrates a system 100 in accordance with one embodiment.

A partially automated member services representative (MSR) bot may handle hand off seamlessly to a human MSR when he or she is available. The MSR bot may include the capability to summarize the automated portion of a call and tools to monitor and review bot behaviors. The recorded MSR calls may be utilized to train the speech synthesizer engine to sound natural and the conversational agent to accurately react to caller requests. The MSR bot may be trained using un-sanitized conversational speech rather than clean, performed speech. The MSR bot may be able to model tone, prosody, and dialect of individual MSRs. The MSR bot may be trained using speech recognition transcripts rather than human transcripts.

Convolutional neural networks (CNNs) are particularly well suited to classifying features in data sets modelled in two or three dimensions. This makes CNNs popular for image classification, because images can be represented in computer memories in three dimensions (two dimensions for width and height, and a third dimension for pixel features like color components and intensity). For example, a color JPEG image of size 480×480 pixels can be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc.). Image classification is the task of taking an input image and outputting a class (a cat, dog, etc.) or a probability of classes that best describes the image.

Fundamentally, CNNs input the data set, pass it through a series of convolutional transformations, nonlinear activation functions (e.g., RELU), and pooling operations (downsampling, e.g., maxpool), and an output layer (e.g., softmax) to generate the classifications.

A method of operating a speech synthesizing conversation agent involves operating an audio interface to receive a caller audio signal during a call session. The method generates an audio transcript comprising a sentiment score from the caller audio signal through operation of a sentiment analysis engine configured by a sentiment model. The method communicates the audio transcript to a user interface switch configured to receive inputs from a user model. The method communicates a response control from the user interface switch to a speech synthesizer engine trained with historical conversation data from the user model. The method then operates the speech synthesizer engine. The speech synthesizer engine generates a response signal for the caller audio signal and the audio transcript through operation of a response logic engine configured by historical conversation data. The speech synthesizer engine generates a synthesized audio response comprising an ambient signal and a synthesized user model response from the response signal through operation of a speech synthesis model configured by the historical conversation data. The method then communicates the synthesized audio response responsive to the caller audio signal through the audio interface during the call session.

The method of operating the speech synthesizing conversation agent may involve operating the speech synthesis model to generate a synthesized speech as the synthesized user model response for the caller audio signal, in response to receiving a text to speech response from the response logic engine.

The method of operating the speech synthesizing conversation agent may involve operating the speech synthesis model to generate listening response cues as the synthesized user model response for the caller audio signal, in response to receiving a non-verbal response from the response logic engine.

The method of operating the speech synthesizing conversation agent may involve receiving a user model input through the user interface switch from the user model, in response to the receiving the caller audio signal through the audio interface. The method may communicate a user model audio response, responsive to the caller audio signal, to the audio interface, the user model audio response comprising response audio and background noise. The method may then store the audio transcript, the caller audio signal, and the user model audio response as historical conversation data in a controlled memory data structure. In some configurations, the method operates the speech synthesis model to generate the ambient signal from the background noise of user model responses in the historical conversation data.

The method of operating the speech synthesizing conversation agent may involve operating the speech synthesizer engine during a supervised training phase to receive call summary transcripts for a plurality of call sessions with the user model. The call summary transcripts may comprise identified entities, call session intent, a sentiment score, and user model responses through the training interface of the response logic engine. During the supervised training phase, the method may identify a response state and generate response options with certainty scores through operation of the response logic engine, in response to receiving a response audit from the user model. The method may receive a feedback control from the user model responsive to the response state, the response options, and the certainty scores.

A non-transitory computer-readable storage medium, the computer-readable storage medium including instructions that when executed by a computer, cause the computer to operate an audio interface to receive caller audio signal during a call session. The computer may generate an audio transcript comprising a sentiment score from the caller audio signal through operation of a sentiment analysis engine. The computer may communicate the audio transcript to a user interface switch configured to receive inputs from a user model. The computer may communicate a response control from the user interface switch to a speech synthesizer engine trained with historical conversation data from the user model. The computer may operate the speech synthesizer engine. The speech synthesizer engine may generate a response signal for the caller audio signal and the audio transcript through operation of response logic engine configured by historical conversation data. The speech synthesizer engine may generate a synthesized audio response comprising an ambient signal and a synthesized user model response from the response signal through operation of a speech synthesis model configured by the historical conversation data. The computer may then communicate the synthesized audio response responsive to the caller audio signal through the audio interface during the call session.

The instructions further configure the computer to operate the speech synthesis model to generate a synthesized speech as the synthesized user model response for the caller audio signal, in response to receiving a text to speech response from the response logic engine.

The instructions may further configure the computer to operate the speech synthesis model to generate listening response cues as the synthesized user model response for the caller audio signal, in response to receiving a non-verbal response from the response logic engine.

The instructions may further configure the computer to receive a user model input through the user interface switch from the user model, in response to the receiving the caller audio signal through the audio interface. The computer may communicate a user model audio response, responsive to the caller audio signal, to the audio interface, the user model audio response comprising response audio and background noise. The computer may then store the audio transcript, the caller audio signal, and the user model audio response as historical conversation data in a controlled memory data structure. In some configurations, the instructions may configure the computer to operate the speech synthesis model to generate the ambient signal from the background noise of user model responses in the historical conversation data.

In some configurations, the instructions may configure the computer to operate the speech synthesizer engine during a supervised training phase. During the supervised training phase, the instruction may configure the computer to receive call summary transcripts for a plurality of call sessions with the user model, the call summary transcripts comprising identified entities, call session intent, the sentiment score, and user model responses through the training interface of the response logic engine. The computer may identify a response state and generate response options with certainty scores through operation of the response logic engine, in response to receiving a response audit from the user model. The computer may receive a feedback control from the user model responsive to the response state, the response options, and the certainty scores.

A computing apparatus may include a processor and a memory storing instructions that, when executed by the processor, configure the apparatus to operate an audio interface to receive caller audio signal during a call session. The apparatus may generate an audio transcript comprising a sentiment score from the caller audio signal through operation of a sentiment analysis engine. The apparatus may communicate the audio transcript to a user interface switch configured to receive inputs from a user model. The apparatus may communicate a response control from the user interface switch to a speech synthesizer engine trained with historical conversation data from the user model. The apparatus may operate the speech synthesizer engine. The speech synthesizer engine may generate a response signal for the caller audio signal and the audio transcript through operation of response logic engine configured by the historical conversation data. The speech synthesizer engine may generate a synthesized audio response comprising an ambient signal and a synthesized user model response from the response signal through operation of a speech synthesis model configured by the historical conversation data. The apparatus may communicate the synthesized audio response responsive to the caller audio signal through the audio interface during the call session.

The instructions may further configure the apparatus to operate the speech synthesis model to generate a synthesized speech as the synthesized user model response for the caller audio signal, in response to receiving a text to speech response from the response logic engine.

The instructions may further configure the apparatus to operate the speech synthesis model to generate listening response cues as the synthesized user model response for the caller audio signal, in response to receiving a non-verbal response from the response logic engine.

The instructions may further configure the apparatus to receive a user model input through the user interface switch from the user model, in response to the receiving the caller audio signal through the audio interface. The apparatus may communicate a user model audio response, responsive to the caller audio signal, to the audio interface, the user model audio response comprising response audio and background noise. The apparatus may store the audio transcript, the caller audio signal, and the user model audio response as the historical conversation data in a controlled memory data structure.

In some configurations, the instructions may further configure the apparatus to operate the speech synthesis model to generate the ambient signal from the background noise of user model responses in the historical conversation data.

The instructions may further configure the apparatus to operate the speech synthesizer engine during a supervised training phase. During the supervised training phase the apparatus may receive call summary transcripts for a plurality of call session with the user model, the call summary transcripts comprising identified entities, call session intent, the sentiment score, and user model responses through the training interface of the response logic engine. The apparatus may identify a response state and generate response options with certainty scores through operation of the response logic engine, in response to receiving a response audit from the user model. The apparatus may receive a feedback control from the user model responsive to the response state, the response options, and the certainty scores.

In an embodiment, an example of an audio transcript generated by the sentiment analysis engine may appear as follows:

```
{
    "transcript": [
        {
            "pretty_transcript": "Hi I just heard a baby.",
            "index": 1,
            "sentiment": {
                "mm_v0": 0.9,
            }
            "word_offsets_ms": [
                870,
                1170,
                1260,
                1590,
                1920,
                1980,
            ],
            "word_durations_ms": [
                300,
                90,
                300,
                330,
                60,
                750,
                240,
                690
            ],
            "connection_id": "69ffe872b5dbf929",
            "start_timestamp_ms": 1531345706000,
            "channel_index": 1,
            "start_ms": 0,
            "duration_ms": 4750,
            "transcript": "hi i just heard a baby",
            "offset_ms": -84
        },
    ],
    "type": "offline"
}
```

The audio transcript shows timings for the duration of each spoken word and the offset between words. Furthermore, the audio transcript illustrates a sentiment index score of 0.9.

In some configurations, the MSR bot may be able to perform a style transfer between multiple MSRs in a single model. The MSR bot may be able to implicitly model sounds such as line noise, non speech vocalizations, and a realistic call center and telephony acoustic environment. Caller's emotions and sentiment during a call session may be utilized to condition text to speech (TTS) models to add realistic dynamics to the TTS prosody (for example, the synthesized voice may modulate its tone in response to anger or concerns detected during the call session. The conversational agent (or MSR bot) may be able to believably handle several turns (talking-listening) of interaction during a call session.

The conversational agent may be designed to only handle portions of a call and may summarize the caller's intent and any resolution achieved in the automated portion of the call. The conversation agent may produce a short summary artifact that would assist a human MSR in a handoff.

The summarization system may include in part or in full a dashboard that provides the transcript of the bot conversation preceding. This dashboard may be a part of tooling utilized to train and interpret the conversational agent. Design of the bot management dashboard may allow an opportunity to explain why the bot chose certain response and provide a mechanism to correct behavior. Labelling special tokens like proper nouns may also allow for structured learning. Additionally, this dashboard may provide a reasonable summary of the conversation up to the hand off point in the call session. A synthetic summarization may be built up on a compound summary from smaller conclusions about the call. This compound summary may work as the basis of the call summarizations.

The TTS portion of the conversational agent may have reasonably high data requirements, on the order of 20-200 hours of speech per MSR. That is after filtering out unusable audio (due to redaction, transfers, cross-talk, etc). Depending on how many voices are intended to model and the style transfer method that has the most success, the dataset used could include hundreds of thousands of calls and transcripts or more.

In some configurations, the conversational agent may not to rely on audio, with the exception of modelling emotion and sentiment as a conditioning signal to the TTS. However, any generative model that's included in the architecture may be trained on the largest possible corpus of call transcripts.

The synthetic summary portion of the conversational agent may rely on small validation datasets; however, if classifiers are trained on calls to detect intent, then the dataset may include several thousand call transcripts per classifier.

In some configurations, training data from previous conversations may be searched using search terms from a caller and search phrase modifier as follows:

Literals

The during training, to search for a word or phrase put it in quotes.

"crash"

"lost credit card"

Adding one to three tildes (~) before the quoted phrase loosens up similar matches (semantically, meaning similar in meaning not sound).

A single tilde may be utilized to match similar forms like plurals or conjugates. For instances:

~"crash" matches "crashes" or "crashing"

Two tildes may be utilized to match synonymous words. For instance:

~~"crash" matches "accident" or "collision"

Three tildes may be utilized to match related phrasings. For instance:

~~~"have a nice day" matches "I hope your day is great"

Phrase Operators

To search within one speech segment for two things, a user may combine search terms with the operators 'near', 'or', or 'then'. For example:

~~"crash" near "honda"
Looks for both ~~"crash" and "honda".
In another example:
~~"crash" or "ticket"
Looks for either ~~"crash" or "ticket" or both.
Still in another example:
~~"crash" then "police report"
Looks for both ~~"crash" and "police report" in order.
For instance, "I had an accident and then they wrote a police report" would match, however "I found the police report after the crash" would not.

Conversation Operators

To search across an entire conversation for two things, a user may combine search terms with the operators and, or, or later.

The and operator looks for a conversation that contains both literals.

~~"lost card" and "two weeks"

Would match a conversation that looks like this.
Hello thanks for calling.
. . .
I want to report a missing card.
. . .
The new card should arrive in one to two weeks.
. . .

However, by contrast the near operator would not match, because they span different speech segments.

The or operator looks for a conversation that contains either literals or both. Its use is determined by context relative to the phrase scanner.

caller ~~"lost card" or caller "two weeks"

Would match a conversation that looks like this.
Hello thanks for calling.
. . .
I want to report a missing card.
. . .
The new card should arrive in five days.
. . .

The later operator looks for a conversation that contains both literals in order.

~~~"reset my password" later ~"thanks"

Would match a conversation that looks like this.
Hello thanks for calling.
. . .
I need my password reset.
. . .
Thank you!
. . .

However, if the final "thank you" was omitted, the conversation would not match, even though thanks was said earlier in the conversation.

Segment Modifiers Additional modifiers may be placed to the left of a segment to restrict it to a certain property or modify it in some other way.

| agent | Only applies if an agent says the following phrase. | agent ~~"great to hear" |
| caller | Only applies if a caller says the following phrase. | caller ~~"very helpful" |
| not | Only applies if the following phrase does not occur. | not ~~"claim" |

Compound Queries

Much more complex queries may be built using parentheses. Inner scanners are evaluated and then combined with outer scanners.

(~~"crash" near ~~"police report") or ~~~"file a claim"

This phrase only matches if a crash and police report are both mentioned or if a claim is filed (or both). However, "police report" alone would not match. This may be done without limit.

((((~~"crash" near ~~"police report") or ~~~"file a claim") later agent ~~"sorry") and caller not ~~"thank you") or "thank you for your help with the claim"

Also notice that modifiers may be stacked too (although order can affect meaning).

not agent ~~"sorry"

Would match a conversation in which an agent does not apologize.

Extractors

Extractors are special phrases in curly braces "{ }" that represent a concept. By default all extractors are treated as if they have two tildes and this may be omitted.

~~"hello my name is {name}"

Would match "hi my name is George"
Some extractors currently in the scanner include:

| {firstName} | Anthony, Steve |
| {surname} | Richardson, Hernandez |
| {fullName} | Anthony Richardson, Steve Hernandez |
| {date} | March Fifth, Christmas |
| {time} | Five thirty a.m., Noon |
| {greeting} | Hi there, good morning |
| {polite} | Thanks, please |
| {positive} | Great, wonderful, amazing |
| {negative} | Terrible, awful, sad |
| {company} | Microsoft, Gridspace |
| {zipCode} | Nine oh two one oh |
| {title} | Mister, Miss, Doctor |
| {phoneNumber} | Eight six seven five three oh nine |

Time Operators

A user may put time constraints on scanners.

Maximum Duration

Specify that less than an amount of time has passed with square brackets, the less than operator, a number, and units.

| [<30 s] | Less than 30 seconds |
| [<5 s] | Less than five seconds |
| [<5 m] | Less than five minutes |

For example,

"interest rate" [<30 s] "a. p. r."

Would look for the phrase "a. p. r." less than thirty seconds after "interest rate".

Minimum Duration

Similar to previous, but it requires that there be more that the specified amount of time between phrases.

| [>20 s] | More than 20 seconds |
| [>100 s] | More than one hundred seconds |
| [>15 m] | More than fifteen minutes |

Start and End Tokens

The start and end of the call may be specified with special extractors for placing time constraints against the start or end of the call.

For example:

{start} [<30 s] "thanks for calling"

Demands "thanks for calling" is said in the first thirty seconds.

Similarly, {end} can indicate the end of the call.

"anything else today" [>1 m] {end}

This would enforce that "anything else today" was said greater than a minute before the end of the call.

Metadata

In the search builder, a user may also place constraints on call session metadata like the date, start time, duration, or user-provided metadata.

The metadata queries may be performed first, and then the scanner may be performed on the resulting subset.

FIG. 1 illustrates a system 100 operating a speech synthesizing conversation agent for generating synthesized audio responses modeled after a member support representative (MSR) during a call session. The system 100 comprises an audio interface 110, a sentiment analysis engine 106, a user interface switch 116, a controlled memory data structure 118, and a speech synthesizer engine 114. During operation of the system 100, an individual calls the call center to speak with an MSR. The caller's audio signals are received through the audio interface 110 as a caller audio signal 120. In the system 100, the caller audio signal 120 comprises audio of the caller stating that they have a problem with their account. Before the caller audio signal 120 is passed further down the system 100, the caller audio signal 120 is communicated to a sentiment analysis engine 106. The sentiment analysis engine 106 comprises a transcription service 102 and a sentiment model 104. The transcription service 102 transcribes the caller audio signal 120 into an audio transcript 108, noting the timing of each spoken word and pause between each spoken word in the caller audio signal 120. The sentiment model 104 is a trained language processing model that is utilized by the sentiment analysis engine 106 to determine a sentiment score 112 from the timings of audio transcript 108.

The audio transcript 108 with the sentiment score 112 is communicated to the user interface switch 116. The user interface switch 116 allows the MSR (user model 136) to review the audio transcript 108 with the sentiment score 112 and determine if they would like to respond to the caller, personally, or allow the speech synthesizer engine 114 to generate a synthesized audio response 130. As the initial communications between the user model 136 and the caller are entirely text based, the sentiment score 112 provides the user with insight into the prosodic features of the caller audio signal 120.

In one scenario, the user model 136 determines that they would like to handle further interactions and communicates a user model input to the user interface switch 116. The user model 136 may then vocalize a response such as "I'm sorry to hear that, let me see what I can do." that is communicated to the audio interface 110 as the user model audio response 128. The user model audio response 128 comprises the user model 136's vocalized response as the response audio 140 and includes background noise 142 from the call center environment. Following this interaction between the user model 136 and the caller, the user model audio response 128, the caller audio signal 120, and the audio transcript 108 comprising the sentiment score 112 are communicated to the controlled memory data structure 118 and stored as historical conversation data 132.

In another scenario, the user model 136 determines that the speech synthesizer engine 114 should handle the response to the caller audio signal 120. The user model 136 communicates a response control 144 to the speech synthesizer engine 114 by way of the user interface switch 116. The speech synthesizer engine 114 comprises a speech synthesis model 124 and a response logic engine 122 for generating a synthesized audio response 130. The response logic engine 122 utilizes a conversational response model trained using the historical conversation data 132 to determine appropriate responses to the caller audio signal 120. The response logic engine 122 utilizes the caller audio signal 120 and the audio transcript 108 comprising the sentiment score 112 to generate a response signal, which the speech synthesis model 124 uses as a basis for the synthesized audio response 130.

The speech synthesis model 124 is modelled using the historical conversation data 132 of the user model 136. The speech synthesis model 124 allows the speech synthesizer engine 114 to generate a synthesized user model response 138 from the response signal with appropriate prosodic features to compliment the detected sentiment in the caller audio signal 120. In addition to the synthesized user model response 138, the synthesized audio response 130 includes an ambient signal 134 modeled after the background noise 142 detected in the user model audio response 128, adding a layer of authenticity to the synthesized audio response 130.

The response logic engine 122 may determine different conversational/response states during the call session. These conversational/response states include an active response state and a passive response state. An active response state may be a state during the call session that the response logic engine 122 determines that synthesized speech response is appropriate for the caller audio signal 120. The synthesized speech response may be appropriate as a response to the sentiment score 112. In the active response state, the response logic engine 122 communicates a text to speech response 126 (TTS response) to the speech synthesis model 124 comprising text to be converted to speech by the speech synthesizer engine 114. In some configurations the synthesized speech response may be appropriate for an identified intent in the conversation such as questions or specific statements identified in the caller audio signal 120.

A passive response state is a conversational state where the speech synthesizer engine 114 may determine that a non-verbal response 146 is appropriate for the caller audio signal 120. The passive response state may include instances in a conversation when the response logic engine 122 determines that an appropriate response is to continue listening to the caller while indicating that MSR side of the conversation is still listening. In this instance, the speech synthesizer engine 114 utilizes non-verbal response 146 and the speech synthesis model 124 to generate a synthesized audio response 130 comprising the ambient signal 134 and listening response cues as the synthesized user model response 138 to indicate that the MSR side of the call session is listening.

During progression of a call session, the user model 136 may decide that the caller may require a personalized response and communicate to the user interface switch 116 that they would like to handle further interactions with caller. Due to the synthesized speech modeled after the user model 136 and the background noise in the ambient signal, the transition from the synthesized audio response 130 to the user model audio response 128 may appear seamless to the caller.

The speech synthesizer engine 114 is an artificial intelligence (A.I.) model trained to receive caller sentiment data and a response signal as determined by a response logic engine 122 and synthesize speech using the voice pattern of a user model to communicate the synthesized audio response 130 with the appropriate emotional modulation to be matched with the sentiment score 112.

Figure 2:
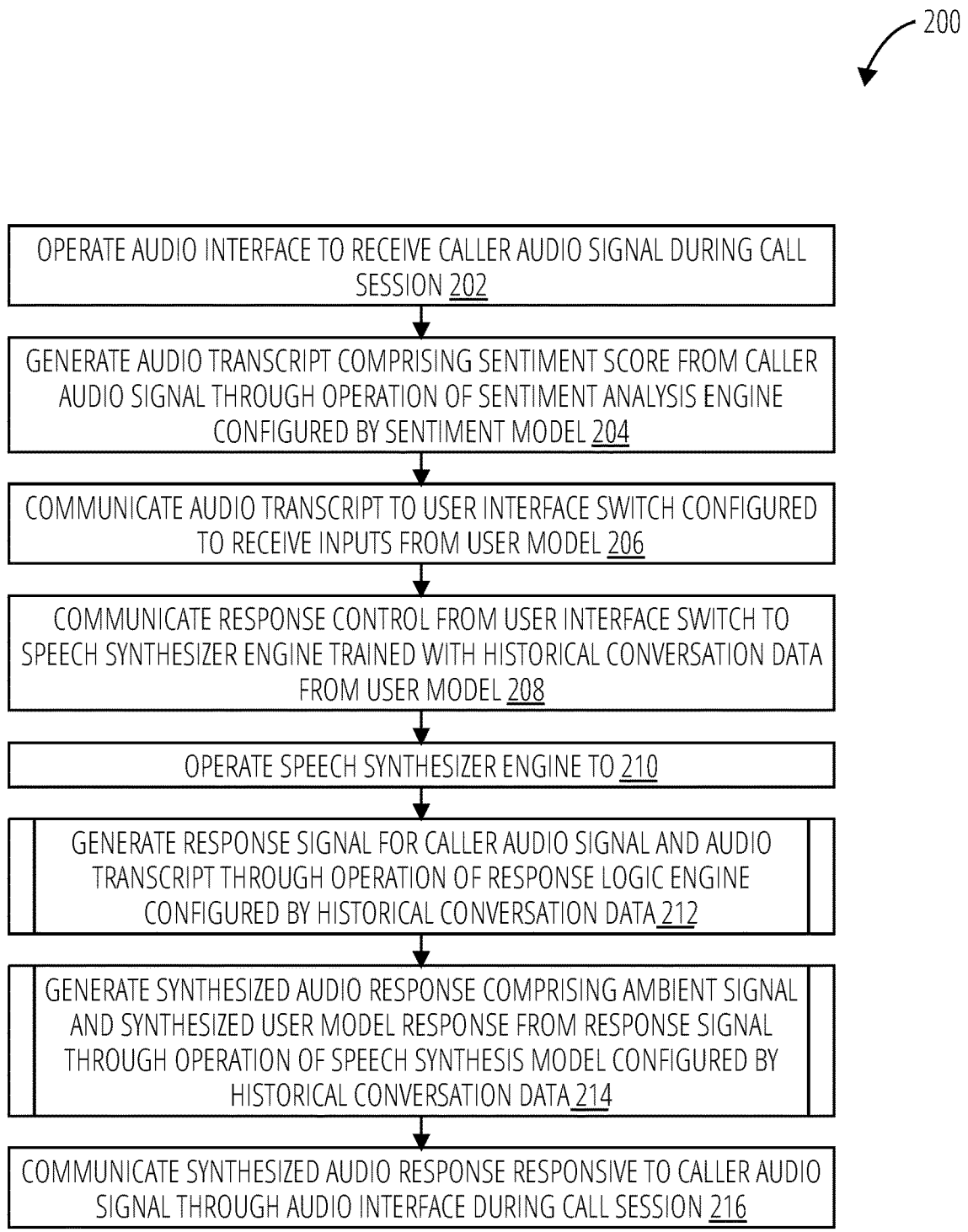
FIG. 2 illustrates a method 200 in accordance with one embodiment.
Figure 4:
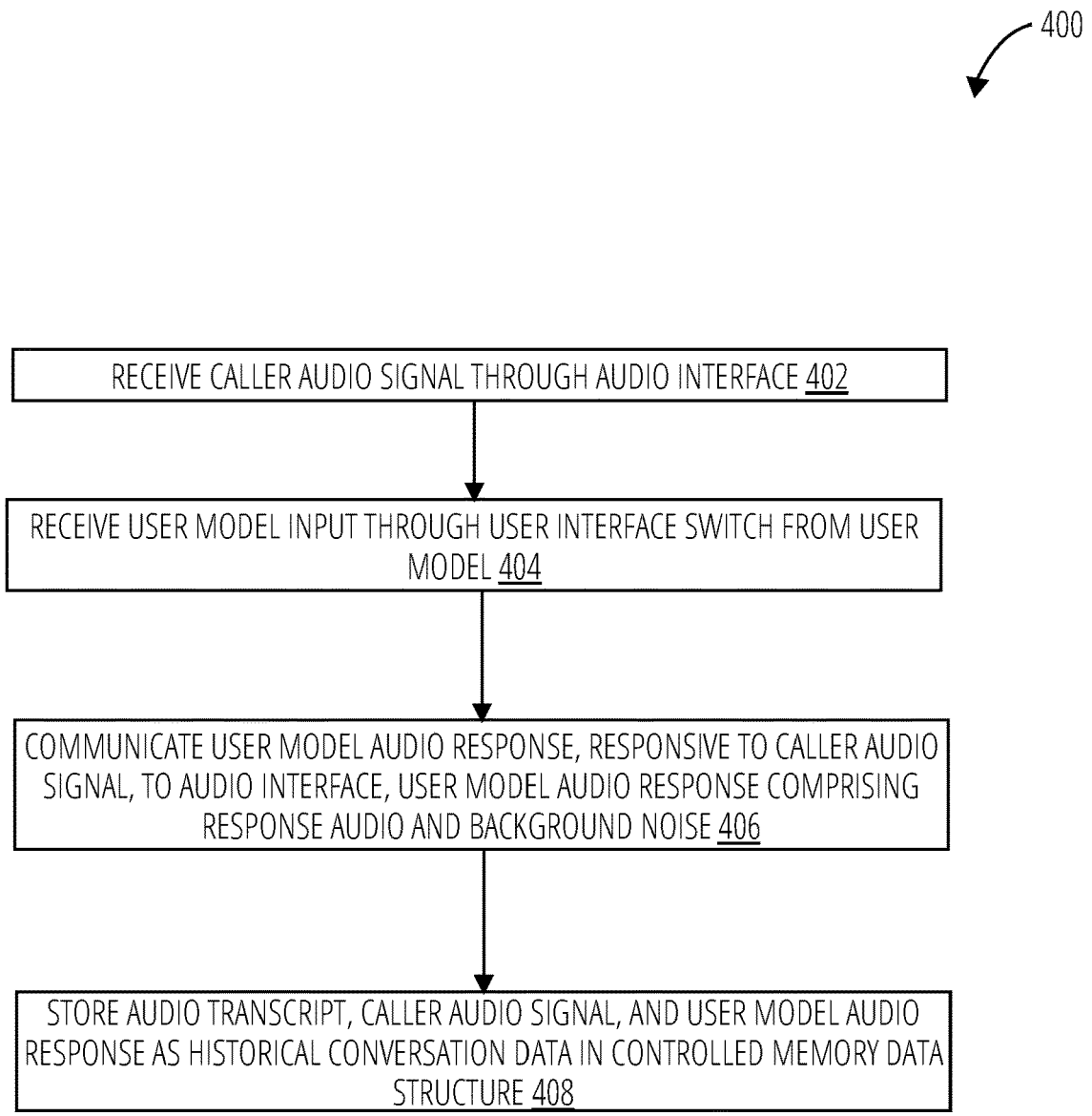
FIG. 4 illustrates a method 400 in accordance with one embodiment.
Figure 5:
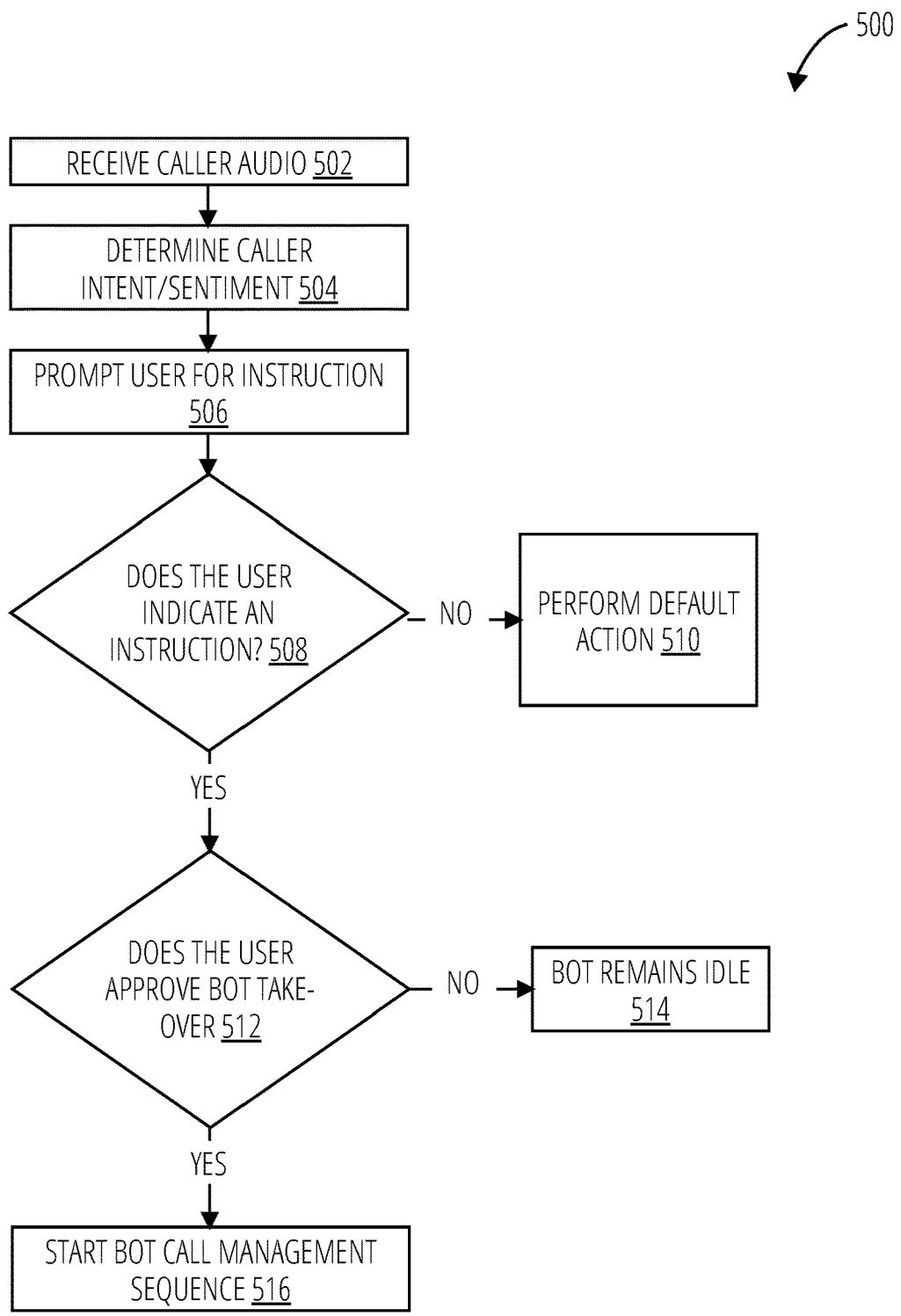
FIG. 5 illustrates a process 500 in accordance with one embodiment.

The system 100 may be operated in accordance to the method described in FIG. 2, FIG. 4, FIG. 5.

Referencing FIG. 2, a method 200 for operating a speech synthesizing conversation agent operates an audio interface to receive caller audio signal during a call session (block 202). In block 204, the method 200 generates an audio transcript comprising a sentiment score from the caller audio signal through operation of a sentiment analysis engine configured by a sentiment model. In block 206, the method 200 communicates the audio transcript to a user interface switch configured to receive inputs from a user model. In block 208, the method 200 communicates a response control from the user interface switch to a speech synthesizer engine trained with historical conversation data from the user model. In block 210, the method 200 operates the speech synthesizer engine. In subroutine block 212, the speech synthesizer engine generate a response signal for the caller audio signal and the audio transcript through operation of a response logic engine configured by the historical conversation data. In subroutine block 214, the speech synthesizer engine generates a synthesized audio response comprising an ambient signal and a synthesized user model response from the response signal through operation of the speech synthesis model configured by the historical conversation data. In block 216, method 200 communicates the synthesized audio response responsive to the caller audio signal through the audio interface during the call session.

Figure 3:
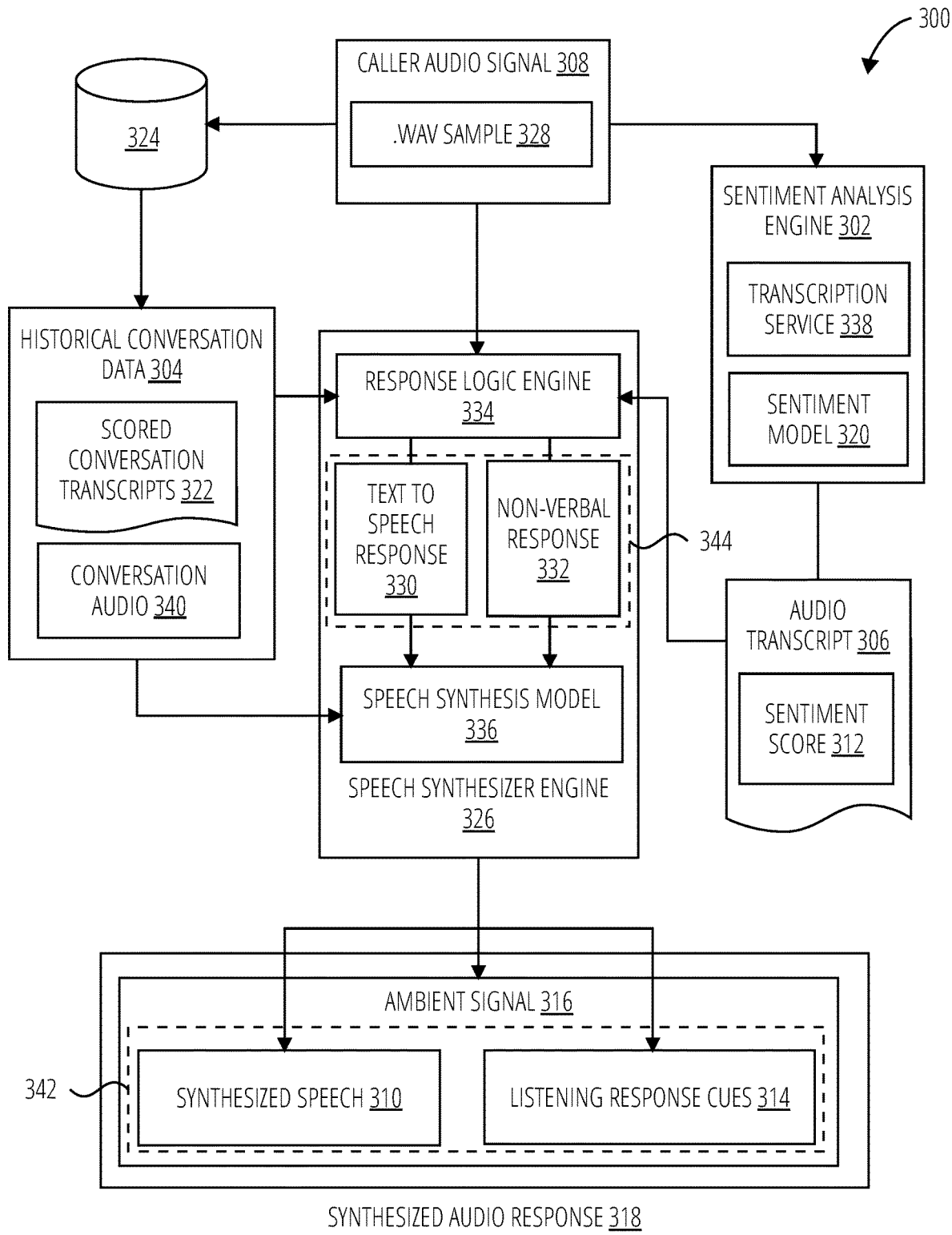
FIG. 3 illustrates a system 300 in accordance with one embodiment.

FIG. 3 illustrates a system 300 showing the information received and generated by a speech synthesizer engine 326. The system 300 comprises a controlled memory data structure 324, a sentiment analysis engine 302, and the speech synthesizer engine 326. The speech synthesizer engine 326 comprises a response logic engine 334 and a speech synthesis model 336. The controlled memory data structure 324 functions as the storage location for historical conversation data 304 comprising scored conversation transcripts 322, such as audio transcripts with sentiment scores, and conversation audio 340, such as caller audio signals corresponding the user model audio responses from a plurality of call session. The historical conversation data 304, an in particular the conversation audio 340 comprising the user model audio responses, may be provided to the speech synthesizer engine 326 to generate/improve the speech synthesis model 336.

The caller audio signal 308 may be provided to the sentiment analysis engine 302, the response logic engine 334, and the controlled memory data structure 324 as a way sample 328. A way sample 328 refers to waveform audio file format (.wav) that is an uncompressed waveform audio that facilitates utilization by the sentiment analysis engine 302 and the speech synthesizer engine 326. The sentiment analysis engine 302 comprises a transcription service 338 and a sentiment model 320. The sentiment analysis engine 302 generates an audio transcript 306 with a sentiment score 312 from the caller audio signal 308 that is communicated to the response logic engine 334.

The response logic engine 334 receives the audio transcript 306 with the sentiment score 312 and the caller audio signal 308 and, in response, generates a response signal 344. The speech synthesis model 336 is configured with the response signal 344 to generate the synthesized audio response 318. The synthesized audio response 318 comprises a synthesized user model response 342 and an ambient signal 316. Depending on the conversation state, the response logic engine 334 may generate a non-verbal response 332 or a text to speech response 330 as the response signal 344 to be communicated to the speech synthesis model 336. If an active conversational state is identified, the response logic engine 334 generates a text to speech response 330 to be utilized by the speech synthesis model 336 to generate synthesized speech 310. If a passive conversation state is identified, the response logic engine 334 generates a non-verbal response 332 to be utilized by the speech synthesis model 336 to generate listening response cues 314.

The system 300 may be operated in accordance with the processed described in FIG. 2, FIG. 4, FIG. 5.

Referencing FIG. 4, a method 400 for operating a speech synthesizing conversation agent receives the caller audio signal through the audio interface (block 402). In block 404, the method 400 receives a user model input through the user interface switch from the user model, in response to the receiving caller audio signal through the audio interface. In block 406, the method 400 communicates a user model audio response, responsive to the caller audio signal, to the audio interface, the user model audio response comprising response audio and background noise. In block 408, method 400 stores the audio transcript, caller audio signal, and the user model audio response as historical conversation data in a controlled memory data structure. During operation of the speech synthesizer engine, the speech synthesis model operating the speech synthesis model to generates the ambient signal from the background noise of user model responses in the historical conversation data.

FIG. 5 illustrates a process 500 for operating the speech synthesizing conversation agent. In block 502, the process 500 receives the caller audio through an audio interface, such as a telephonic switch board. In block 504, the process 500 determines the caller's intent and sentiment. The determination of intent and sentiment of the caller may be accomplished by the sentiment analysis engine. The determination of the intent may be accomplished as a result of the transcription of the caller audio and the context of the transcribed words. The determination of the sentiment of the caller may be accomplished through the use of the sentiment model. In some cases, the determination of the intent and sentiment of the call may be communicated to a user interface switch as an audio transcript with sentiment score. The caller intent/sentiment may be communicated to a user interface switch which prompts the user (MSR) for instructions on how to proceed (block 506). The instructions from the user may be provided back to the user interface switch in the form of a user model input Based on the communicated intent and sentiment of the caller the user may indicate instructions (decision block 508). If the user does not indicate an action, the speech synthesizing conversation agent may take over and preform a default set of actions (block 510). In some instances, the default set of actions performed by the speech synthesizing conversation agent may be to respond to the caller audio with a synthesized audio response. The instructions may indicate approval by the user to allow the speech synthesizing conversation agent (bot) to handle the response to the caller audio (decision block 512). If the user indicates that they do not want to allow the bot to handle the response to the caller audio, the user may respond to the caller audio while the bot remains idle (block 514). If the user indicates that they do want to allow the bot to handle the response to the caller audio, the bot may start it's call management sequence for generating the synthesized audio response (block 516).

Figure 6:
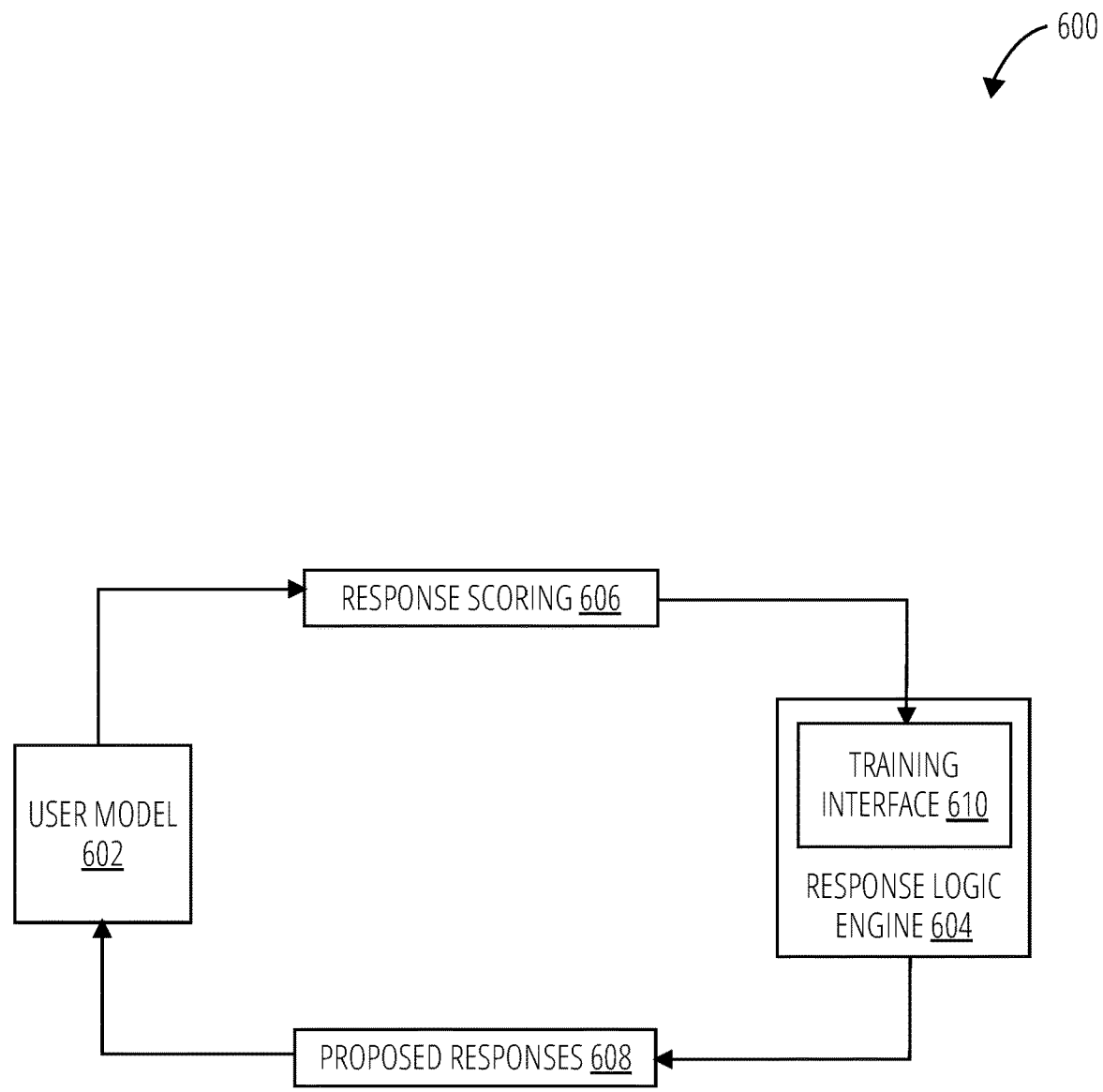
FIG. 6 illustrates a supervised training phase 600 in accordance with one embodiment.

FIG. 6 illustrates a supervised training phase 600 for the response logic engine 604. The supervised training phase 600 may prompt the response logic engine 604 for proposed responses 608 to a caller transcript. The user model 602 may then evaluate the proposed responses 608 and communicate response scoring 606 to the training interface 610 of the response logic engine 604.

Figure 7:
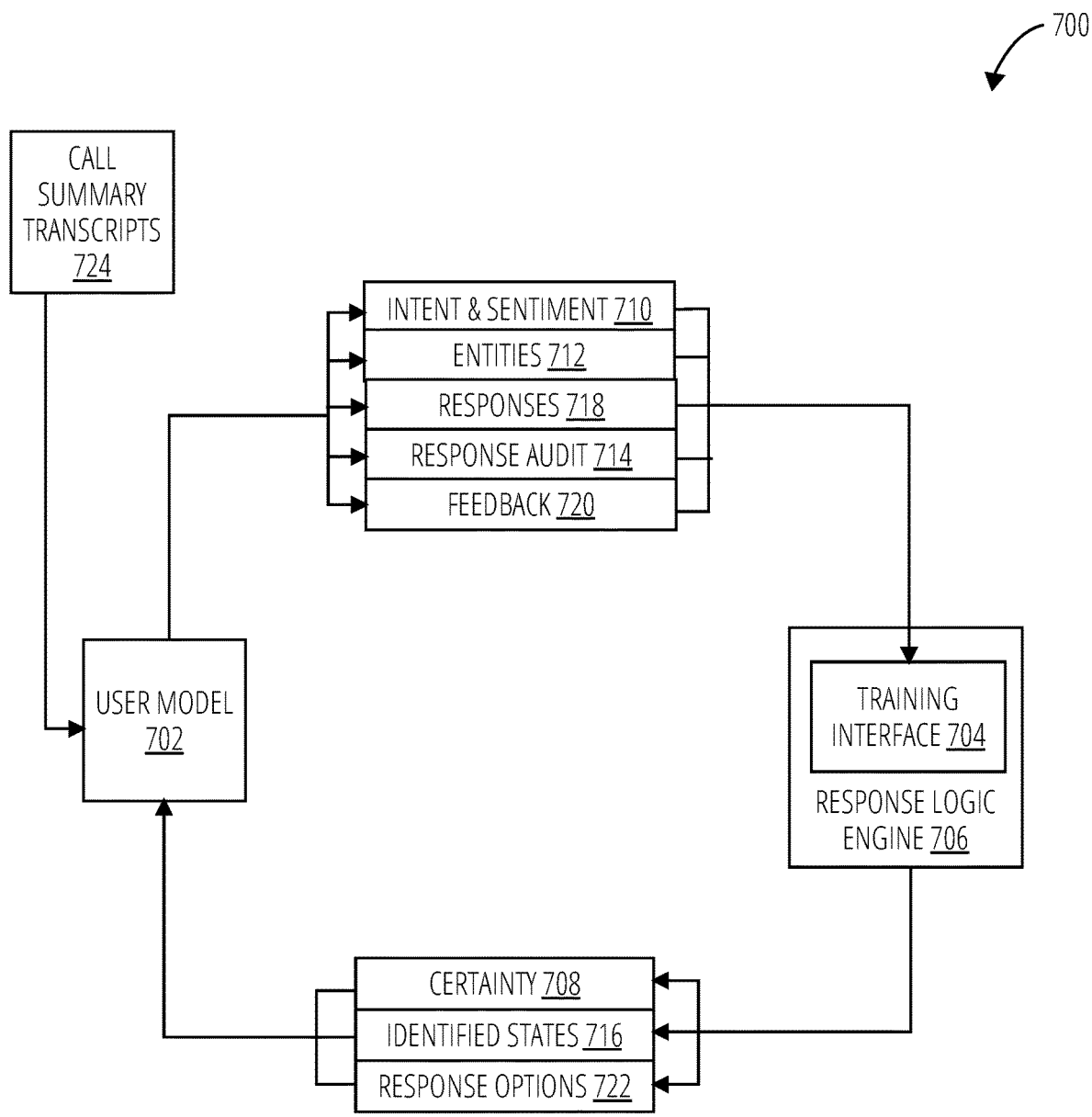
FIG. 7 illustrates a supervised training phase 700 in accordance with one embodiment.

FIG. 7 illustrates a supervised training phase 700 for the response logic engine 706. During the supervised training phase 700 the user model 702 may act as an expert user that trains the response logic engine 706 through a training interface 704. The user model 702 may communicate a plurality of call summary transcripts 724 to the response logic engine 706 through the training interface 704. The training interface 704 may receive call session intent and sentiment score 710 as well as identified entities 712 in a call summary transcripts 724 from call sessions involving the user model 702. The call session intent and sentiment score 710 and the identified entities 712 may be identified within the call summary transcripts 724 as annotations, manually entered by the user model 702. The annotation style utilized by the user model 702 may be particularly configured for understanding by the response logic engine 706. The audio transcript may include transcribed user model responses 718 from the user model 702. The response logic engine 706 may utilize the call session intent and sentiment score 710, the identified entities 712, and the user model responses 718 to build a conversational model for generating caller audio responses. The user model 702 may communicate a response audit 714 for a portion of a call transcript to the response logic engine 706. The response logic engine 706 may respond with the identified response state 716 of the current conversation, a response options 722 and certainty scores 708 for the response options. In turn the user model 702 may provide a feedback control 720 for validating or adjusting the response options.

Figure 8:
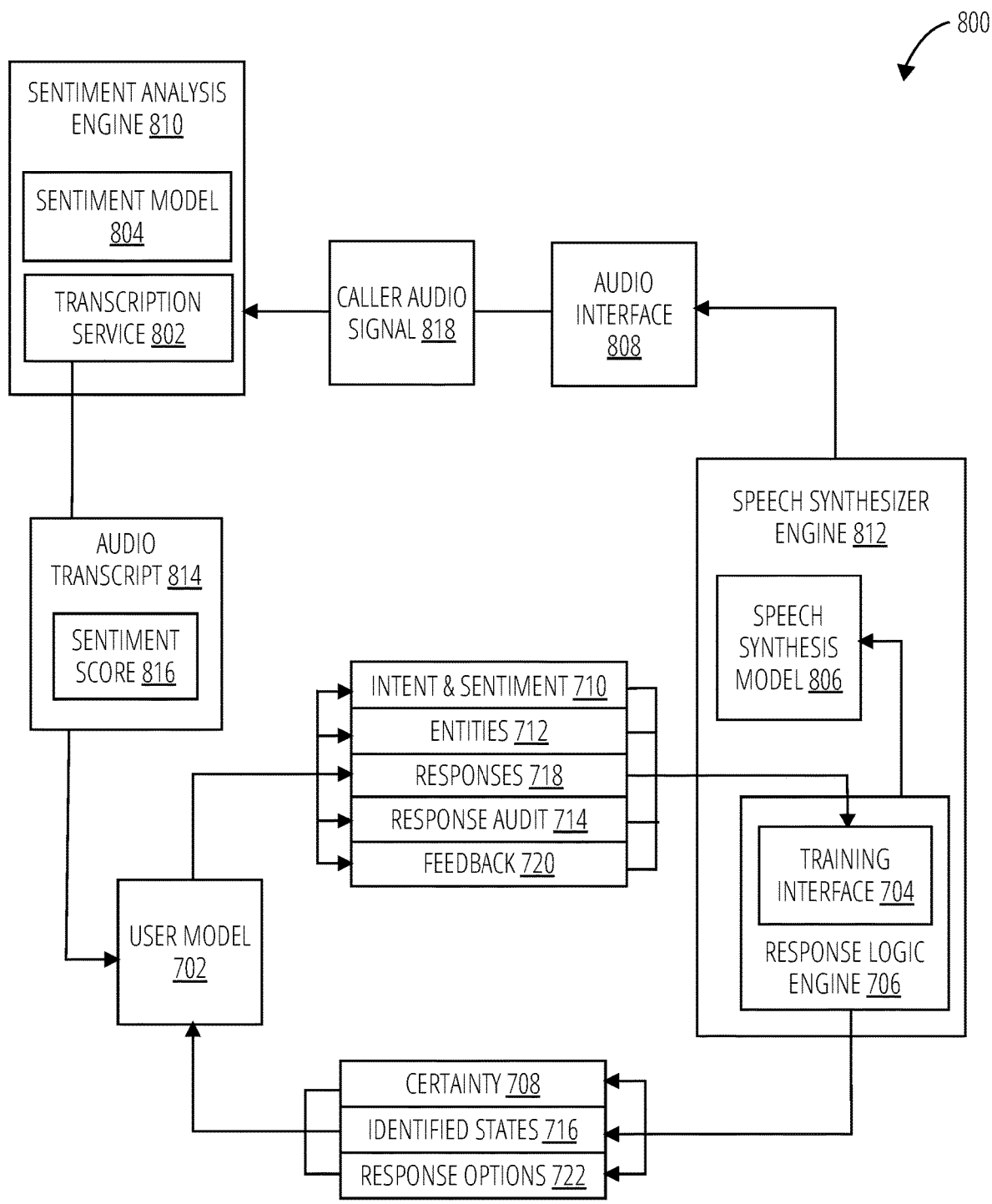
FIG. 8 illustrates a supervised training phase 800 in accordance with one embodiment.

FIG. 8 illustrates a supervised training phase 800 for the speech synthesizing conversation agent. During the supervised training phase 800, the audio interface 808 receives a caller audio signal 818 that is communicated to the sentiment analysis engine 810 comprising the sentiment model 804 and the transcription service 802. The transcription service 802 of the sentiment analysis engine 810 generates an audio transcript 814 comprising a sentiment score 816. The audio transcript 814 is communicated to the user model 702 which communicates it to the training interface 704 of the response logic engine 706. The response logic engine 706 identifies an identified response state 716 for the conversation as well as response options 722 and certainty scores 708 that are communicated to the user model 702. During the supervised training phase 800, the speech synthesizer engine 812 may utilize the generated responses from the speech synthesizer engine 812 with the speech synthesis model 806 to generate synthesized audio responses for the caller audio signal 818. The user model 702 may provide a feedback control 720 to improve responses communicated to the audio interface 808.

Figure 9:
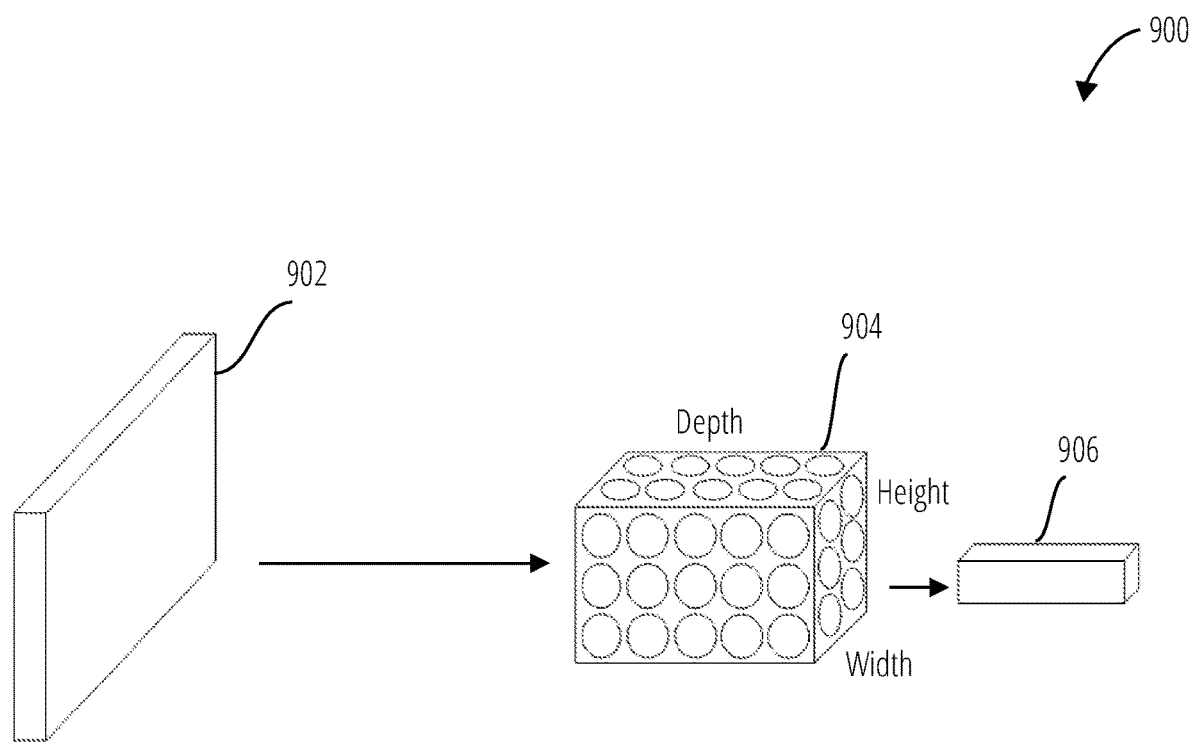
FIG. 9 illustrates a convolutional neural network 900 in accordance with one embodiment.

FIG. 9 illustrates an exemplary convolutional neural network 900. The convolutional neural network 900 arranges its neurons in three dimensions (width, height, depth), as visualized in convolutional layer 904. Every layer of the convolutional neural network 900 transforms a 3D volume of inputs to a 3D output volume of neuron activations. In this example, the input layer 902 encodes the image, so its width and height would be the dimensions of the image, and the depth would be 3 (Red, Green, Blue channels). The convolutional layer 904 further transforms the outputs of the input layer 902, and the output layer 906 transforms the outputs of the convolutional layer 904 into one or more classifications of the image content.

Figure 10:
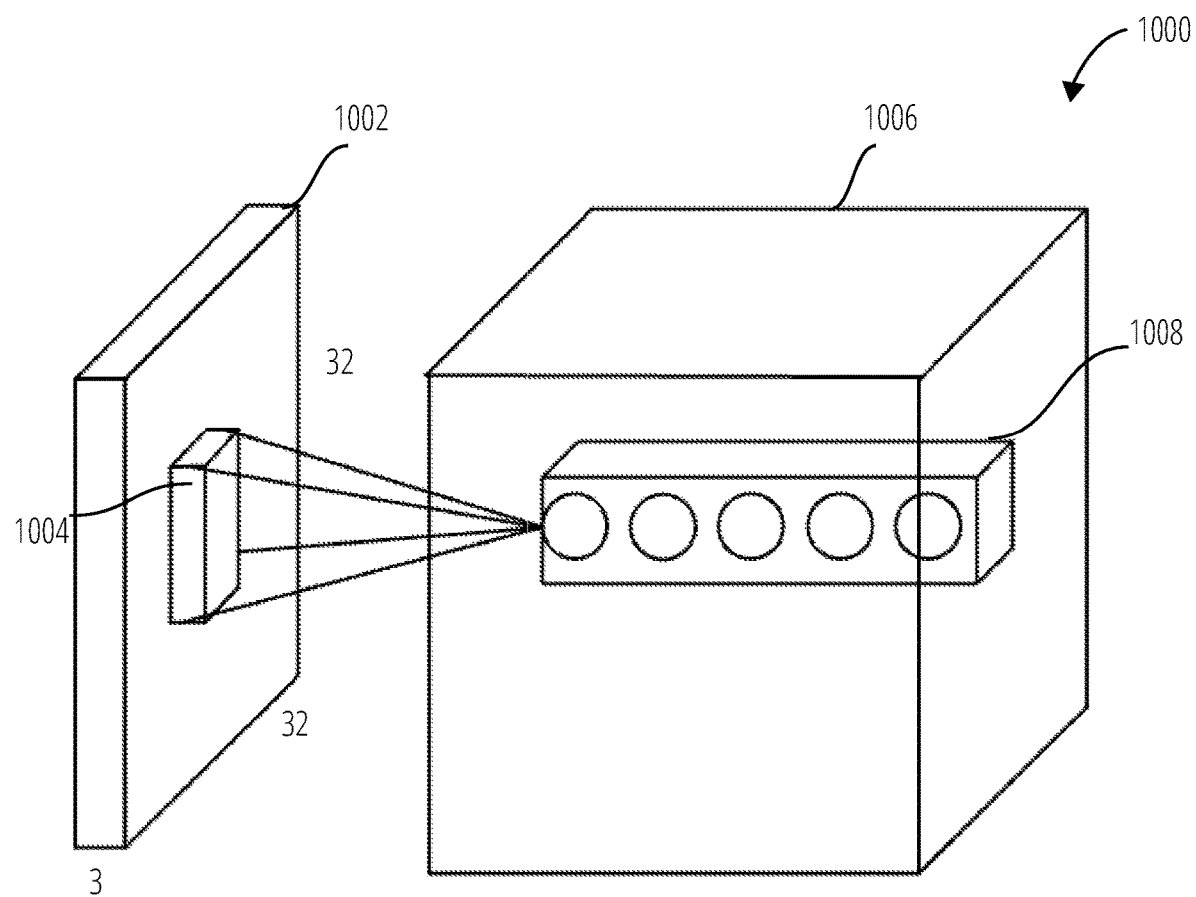
FIG. 10 illustrates a convolutional neural network layers 1000 in accordance with one embodiment.

FIG. 10 illustrates an exemplary convolutional neural network layers 1000 in more detail. An example subregion of the input layer region 1004 of an input layer region 1002 region of an image is analyzed by a set of convolutional layer subregion 1008 in the convolutional layer 1006. The input layer region 1002 is 32×32 neurons long and wide (e.g., 32×32 pixels), and three neurons deep (e.g., three color channels per pixel). Each neuron in the convolutional layer 1006 is connected only to a local region in the input layer region 1002 spatially (in height and width), but to the full depth (i.e. all color channels if the input is an image). Note, there are multiple neurons (5 in this example) along the depth of the convolutional layer subregion 1008 that analyzes the subregion of the input layer region 1004 of the input layer region 1002, in which each neuron of the convolutional layer subregion 1008 may receive inputs from every neuron of the subregion of the input layer region 1004.

Figure 11:
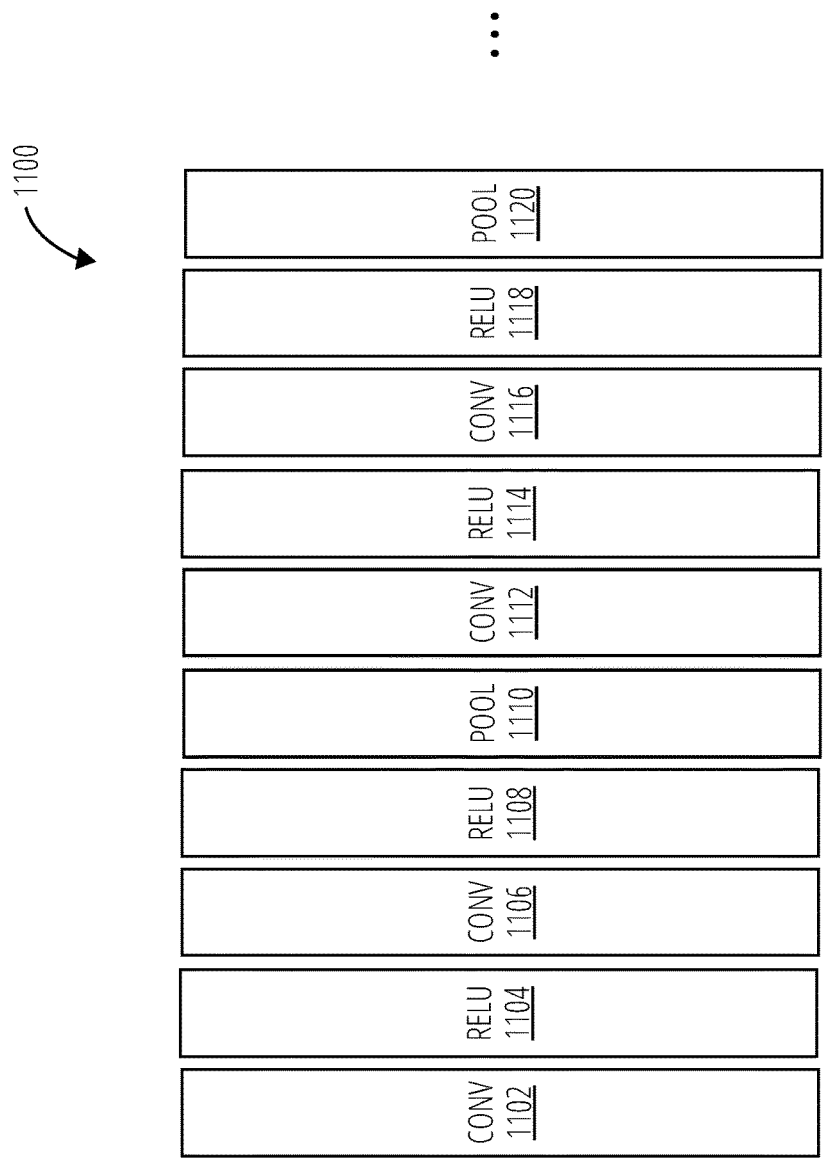
FIG. 11 illustrates a VGG net 1100 in accordance with one embodiment.

FIG. 11 illustrates a popular form of a convolutional neural network (CNN) known as a VGG net 1100. The initial convolution layer 1102 stores the raw image pixels and the final pooling layer 1120 determines the class scores. Each of the intermediate convolution layers (convolution layer 1106, convolution layer 1112, and convolution layer 1116) and rectifier activations (RELU layer 1104, RELUlayer 1108, RELUlayer 1114, and RELUlayer 1118) and intermediate pooling layers (pooling layer 1110, pooling layer 1120) along the processing path is shown as a column.

The VGG net 1100 replaces the large single-layer filters of basic CNNs with multiple 3×3 sized filters in series. With a given receptive field (the effective area size of input image on which output depends), multiple stacked smaller size filters may perform better at image feature classification than a single layer with a larger filter size, because multiple non-linear layers increase the depth of the network which enables it to learn more complex features. In a VGG net 1100 each pooling layer may be only 2×2.

Figure 12:
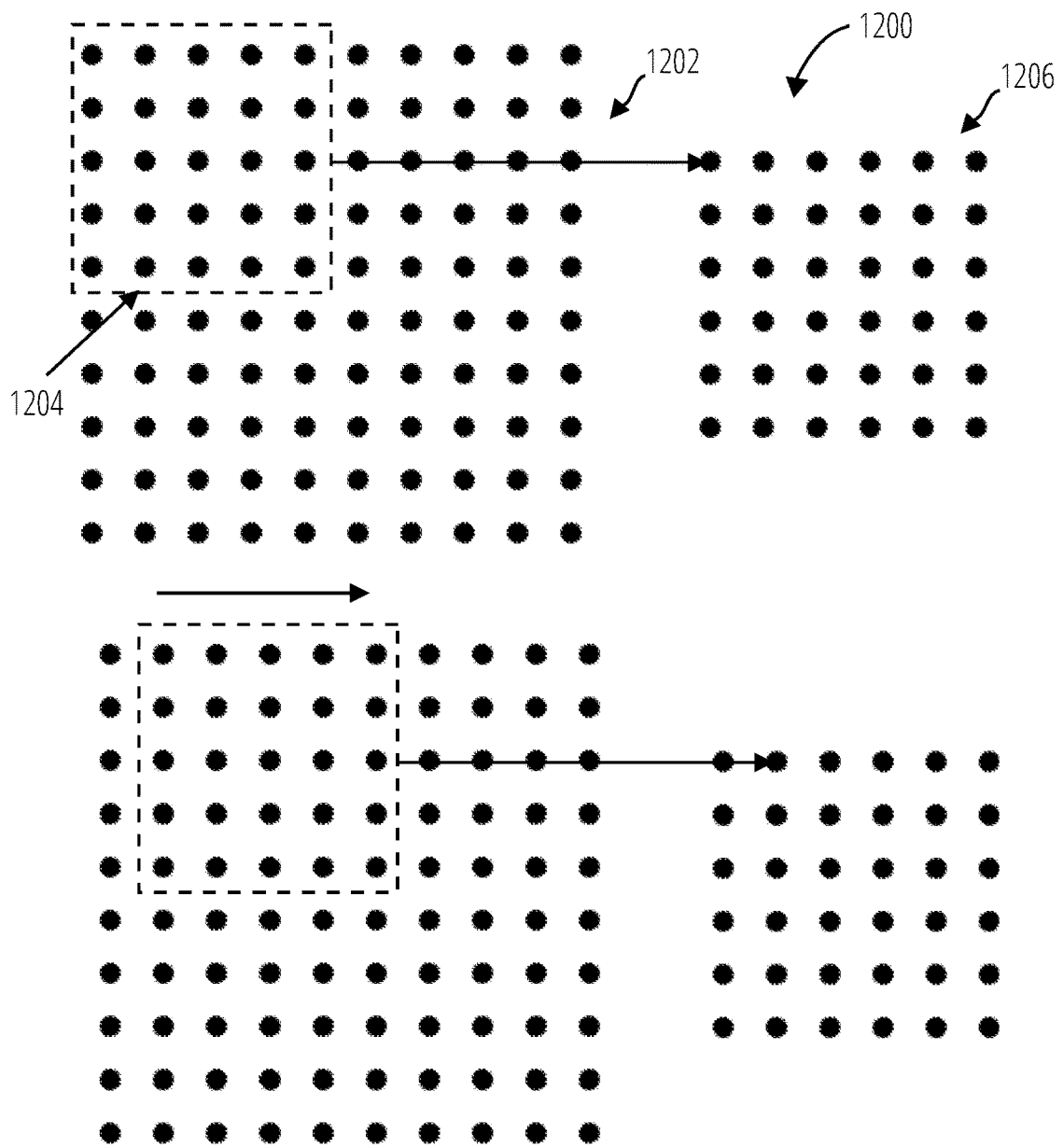
FIG. 12 illustrates a convolution layer filtering 1200 in accordance with one embodiment.

FIG. 12 illustrates a convolution layer filtering 1200 that connects the outputs from groups of neurons in a convolution layer 1202 to neurons in a next layer 1206. A receptive field is defined for the convolution layer 1202, in this example sets of 5×5 neurons. The collective outputs of each neuron the receptive field are weighted and mapped to a single neuron in the next layer 1206. This weighted mapping is referred to as the filter 1204 for the convolution layer 1202 (or sometimes referred to as the kernel of the convolution layer 1202). The filter 1204 depth is not illustrated in this example (i.e., the filter 1204 is actually a cubic volume of neurons in the convolution layer 1202, not a square as illustrated). Thus what is shown is a "slice" of the full filter 1204. The filter 1204 is slid, or convolved, around the input image, each time mapping to a different neuron in the next layer 1206. For example FIG. 12 shows how the filter 1204 is stepped to the right by 1 unit (the "stride"), creating a slightly offset receptive field from the top one, and mapping its output to the next neuron in the next layer 1206. The stride can be and often is other numbers besides one, with larger strides reducing the overlaps in the receptive fields, and hence further reducing the size of the next layer 1206. Every unique receptive field in the convolution layer 1202 that can be defined in this stepwise manner maps to a different neuron in the next layer 1206. Thus, if the convolution layer 1202 is 32×32×3 neurons per slice, the next layer 1206 need only be 28×28×1 neurons to cover all the receptive fields of the convolution layer 1202. This is referred to as an activation map or feature map. There is thus a reduction in layer complexity from the filtering. There are 784 different ways that a 5×5 filter can uniquely fit on a 32×32 convolution layer 1202, so the next layer 1206 need only be 28×28. The depth of the convolution layer 1202 is also reduced from 3 to 1 in the next layer 1206.

The number of total layers to use in a CNN, the number of convolution layers, the filter sizes, and the values for strides at each layer are examples of "hyperparameters" of the CNN.

Figure 13:
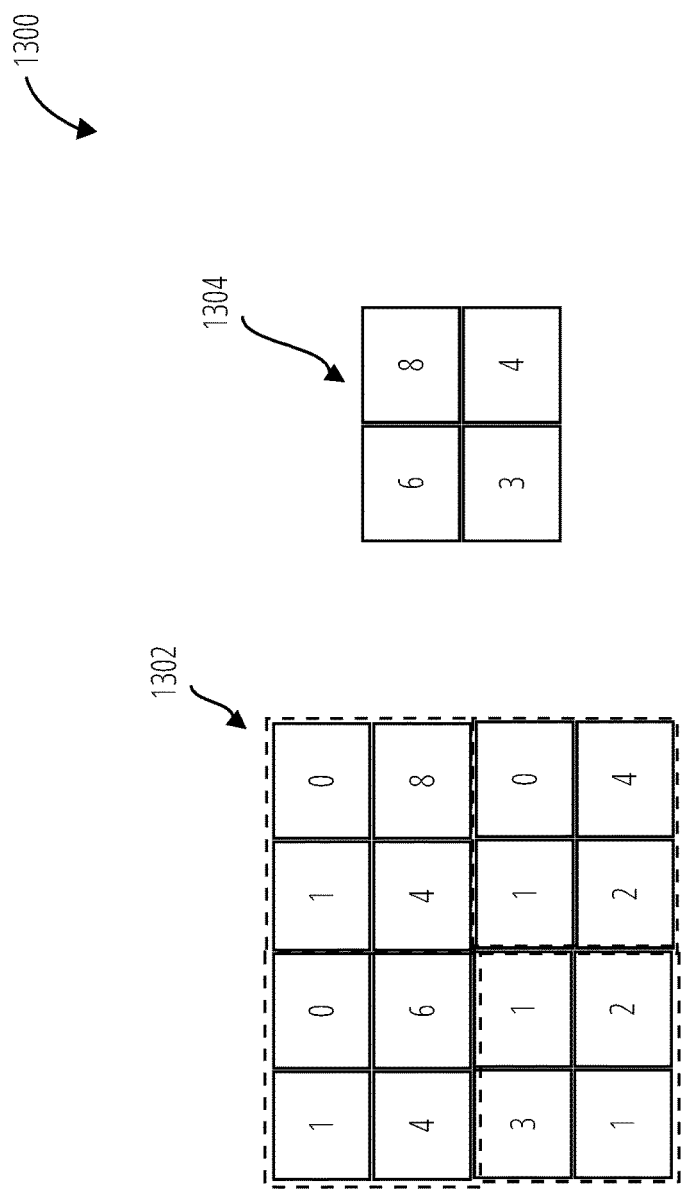
FIG. 13 illustrates a pooling layer function 1300 in accordance with one embodiment.

FIG. 13 illustrates a pooling layer function 1300 with a 2×2 receptive field and a stride of two. The pooling layer function 1300 is an example of the maxpool pooling technique. The outputs of all the neurons in a particular receptive field of the input layer 1302 are replaced by the maximum valued one of those outputs in the pooling layer 1304. Other options for pooling layers are average pooling and L2-norm pooling. The reason to use a pooling layer is that once a specific feature is recognized in the original input volume (there will be a high activation value), its exact location is not as important as its relative location to the other features. Pooling layers can drastically reduce the spatial dimension of the input layer 1302 from that point forward in the neural network (the length and the width change but not the depth). This serves two main purposes. The first is that the amount of parameters or weights is greatly reduced thus lessening the computation cost. The second is that it will control overfitting. Overfitting refers to when a model is so tuned to the training examples that it is not able to generalize well when applied to live data sets.

Figure 14:
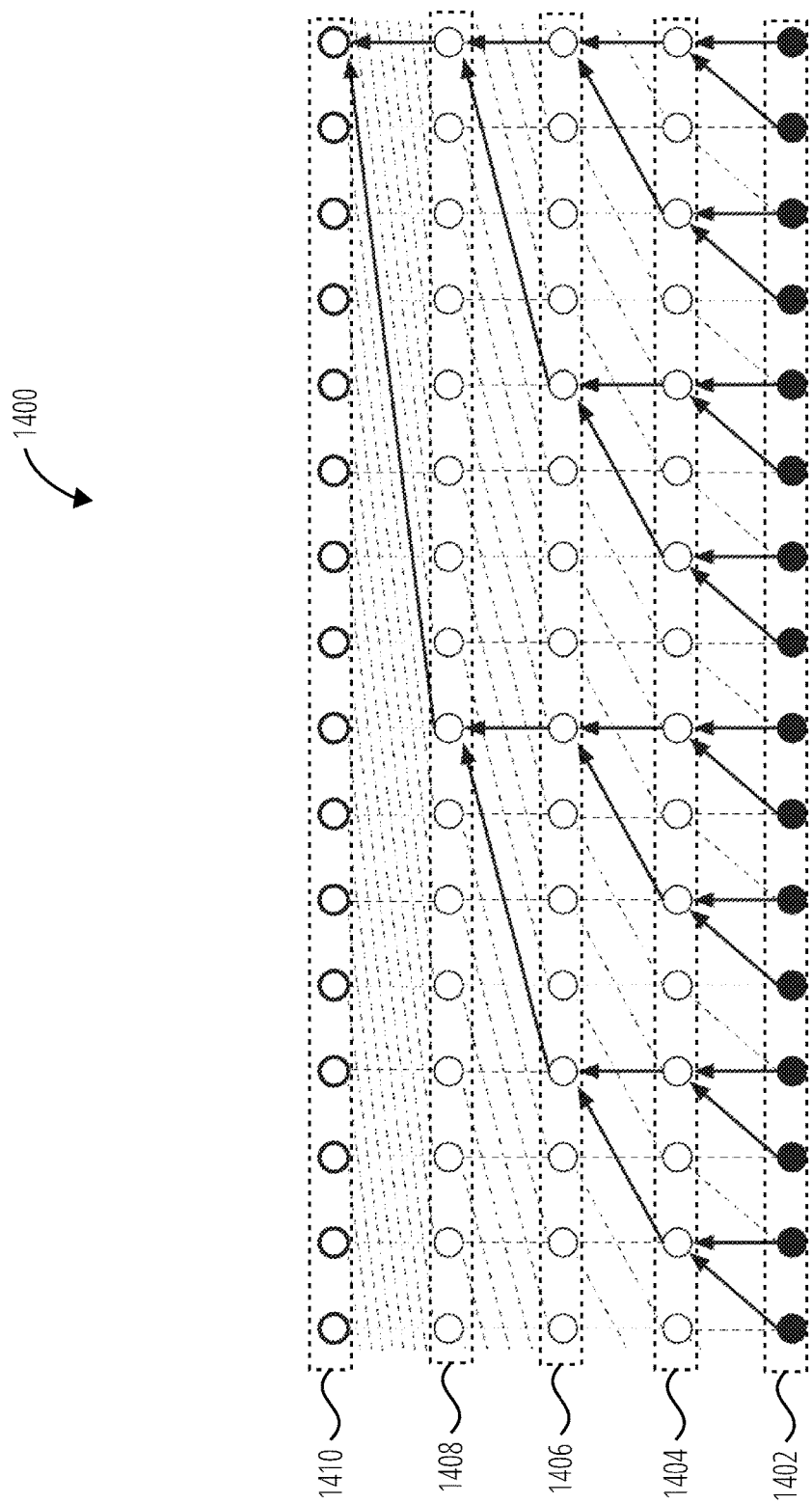
FIG. 14 illustrates a diagram 1400 in accordance with one embodiment.

FIG. 14 illustrates a diagram 1400 illustrating visualization of a WaveNet stack and its receptive fields. The speech synthesizer engine may be configured from a Wavenet auto regressive model. The diagram 1400 shows an input layer 1402 at the bottom feeding into a hidden layer 1404 with a dilation of one. The hidden layer 1404 feeds into the hidden layer 1406 with a dilation of two. The hidden layer 1406 feeds into the hidden layer 1408 with a dilation of four. The hidden layer 1408 feeds into the output layer 1410 with a dilation of eight.

Raw audio data is typically very high-dimensional (e.g. 16,000 samples per second for 16 kHz audio), and contains complex, hierarchical structures spanning many thousands of time steps, such as words in speech or melodies in music. Modelling such long-term dependencies with standard causal convolution layers would require a very deep network to ensure a sufficiently broad receptive field. WaveNet avoids this constraint by using dilated causal convolutions, which allow the receptive field to grow exponentially with depth.

WaveNet is a type of feedforward neural network known as a deep convolutional neural network (CNN). These consist of layers of interconnected nodes somewhat analogous to a brain's neurons. In WaveNet, the CNN takes a raw signal as an input and synthesizes an output one sample at a time. It does so by sampling from a softmax (i.e. categorical) distribution of a signal value that is encoded using μ-law compounding transformation and quantized to 256 possible values.

"CTC loss function" refers to connectionist temporal classification, a type of neural network output and associated scoring function, for training recurrent neural networks (RNNs) such as LSTM networks to tackle sequence problems where the timing is variable. A CTC network has a continuous output (e.g. softmax), which is fitted through training to model the probability of a label. CTC does not attempt to learn boundaries and timings: Label sequences are considered equivalent if they differ only in alignment, ignoring blanks. Equivalent label sequences can occur in many ways—which makes scoring a non-trivial task. Fortunately there is an efficient forward-backward algorithm for that. CTC scores can then be used with the back-propagation algorithm to update the neural network weights. Alternative approaches to a CTC-fitted neural network include a hidden Markov model (HMM).

"Gated Recurrent Unit (GRU)" refers to are a gating mechanism in recurrent neural networks. GRUs may exhibit better performance on smaller datasets than do LSTMs. They have fewer parameters than LSTM, as they lack an output gate. See https://en.wikipedia.org/wiki/Gated_recurrent_unit "beam search" refers to a heuristic search algorithm that explores a graph by expanding the most promising node in a limited set. Beam search is an optimization of best-first search that reduces its memory requirements. Best-first search is a graph search which orders all partial solutions (states) according to some heuristic. But in beam search, only a predetermined number of best partial solutions are kept as candidates. It is thus a greedy algorithm. Beam search uses breadth-first search to build its search tree. At each level of the tree, it generates all successors of the states at the current level, sorting them in increasing order of heuristic cost. However, it only stores a predetermined number, (3, of best states at each level (called the beam width). Only those states are expanded next. The greater the beam width, the fewer states are pruned. With an infinite beam width, no states are pruned and beam search is identical to breadth-first search. The beam width bounds the memory required to perform the search. Since a goal state could potentially be pruned, beam search sacrifices completeness (the guarantee that an algorithm will terminate with a solution, if one exists). Beam search is not optimal (that is, there is no guarantee that it will find the best solution). In general, beam search returns the first solution found. Beam search for machine translation is a different case: once reaching the configured maximum search depth (i.e. translation length), the algorithm will evaluate the solutions found during search at various depths and return the best one (the one with the highest probability). The beam width can either be fixed or variable. One approach that uses a variable beam width starts with the width at a minimum. If no solution is found, the beam is widened and the procedure is repeated.

"Adam optimizer" refers to an optimization algorithm that can used instead of the classical stochastic gradient descent procedure to update network weights iterative based in training data. Stochastic gradient descent maintains a single learning rate (termed alpha) for all weight updates and the learning rate does not change during training. A learning rate is maintained for each network weight (parameter) and separately adapted as learning unfolds. Adam as combining the advantages of two other extensions of stochastic gradient descent. Specifically, Adaptive Gradient Algorithm (AdaGrad) that maintains a per-parameter learning rate that improves performance on problems with sparse gradients (e.g. natural language and computer vision problems), and Root Mean Square Propagation (RMSProp) that also maintains per-parameter learning rates that are adapted based on the average of recent magnitudes of the gradients for the weight (e.g. how quickly it is changing). This means the algorithm does well on online and non-stationary problems (e.g. noisy). Adam realizes the benefits of both AdaGrad and RMSProp. Instead of adapting the parameter learning rates based on the average first moment (the mean) as in RMSProp, Adam also makes use of the average of the second moments of the gradients (the uncentered variance). Specifically, the algorithm calculates an exponential moving average of the gradient and the squared gradient, and the parameters beta1 and beta2 control the decay rates of these moving averages. The initial value of the moving averages and beta1 and beta2 values close to 1.0 (recommended) result in a bias of moment estimates towards zero. This bias is overcome by first calculating the biased estimates before then calculating bias-corrected estimates.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

One type of sentiment analysis engine is described in full in U.S. Ser. No. 15/375,634 "Method and system for achieving emotional text to speech" filed on Dec. 12, 2016. The described synthesizer may utilize sentiment scores derived from any number of known sentiment analysis engines/algorithms.

What is claimed is:

1. A method of operating a speech synthesizing conversation agent comprising:
   operating an audio interface to receive a caller audio signal during a call session;
   generating an audio transcript comprising a sentiment score from the caller audio signal through operation of a sentiment analysis engine configured by a sentiment model;
   communicating the audio transcript to a user interface switch configured to receive inputs from a user model;
   communicating a response control from the user interface switch to a speech synthesizer engine trained with historical conversation data from the user model;
   operating the speech synthesizer engine to:
      generate a response signal for the caller audio signal and the audio transcript through operation of a response logic engine configured by the historical conversation data; and
      generate a synthesized audio response comprising an ambient signal and a synthesized user model response from the response signal through operation of a speech synthesis model configured by the historical conversation data; communicating the synthesized audio response, responsive to the caller audio signal, through the audio interface during the call session;
   receiving a user model input through the user interface switch from the user model, in response to the receiving the caller audio signal through the audio interface;
   communicating a user model audio response, responsive to the caller audio signal, to the audio interface, the user model audio response comprising response audio and background noise;
   storing the audio transcript, the caller audio signal, and the user model audio response as the historical conversation data in a controlled memory data structure; and
   operating the speech synthesis model to generate the ambient signal from the background noise of user model responses in the historical conversation data.

2. The method of operating the speech synthesizing conversation agent of claim 1, further comprising:
   operating the speech synthesis model to generate a synthesized speech as the synthesized user model response for the caller audio signal, in response to receiving a text to speech response from the response logic engine.

3. The method of operating the speech synthesizing conversation agent of claim 1 further comprising:
   operating the speech synthesis model to generate listening response cues as the synthesized user model response for the caller audio signal, in response to receiving a non-verbal response from the response logic engine.

4. The method of operating the speech synthesizing conversation agent of claim 1, further comprising:
   operating the speech synthesizer engine during a supervised training phase to:
      receive call summary transcripts for a plurality of call session with the user model, the call summary transcripts comprising identified entities, call session intent, the sentiment score, and user model responses through the training interface of the response logic engine;
      identify a response state and generate response options with certainty scores through operation of the response logic engine, in response to receiving a response audit from the user model; and receive a feedback control from the user model responsive to the response state, the response options, and the certainty scores.

5. A non-transitory computer-readable storage medium, the computer-readable storage medium including instructions that when executed by a computer, cause the computer to:
operate an audio interface to receive a caller audio signal during a call session;
generate an audio transcript comprising a sentiment score from the caller audio signal through operation of a sentiment analysis engine configured by a sentiment model;
communicate the audio transcript to a user interface switch configured to receive inputs from a user model;
communicate a response control from the user interface switch to a speech synthesizer engine trained with historical conversation data from the user model;
operate the speech synthesizer engine to:
generate a response signal for the caller audio signal and the audio transcript through operation of a response logic engine configured by the historical conversation data; and
generate a synthesized audio response comprising an ambient signal and a synthesized user model response from the response signal through operation of a speech synthesis model configured by the historical conversation data;
communicate the synthesized audio response, responsive to the caller audio signal, through the audio interface during the call session;
receive a user model input through the user interface switch from the user model, in response to the receiving the caller audio signal through the audio interface;
communicate a user model audio response, responsive to the caller audio signal, to the audio interface, the user model audio response comprising response audio and background noise;
store the audio transcript, the caller audio signal, and the user model audio response as the historical conversation data in a controlled memory data structure; and
operate the speech synthesis model to generate the ambient signal from the background noise of user model responses in the historical conversation data.

6. The computer-readable storage medium of claim 5, wherein the instructions further configure the computer to:
operate the speech synthesis model to generate a synthesized speech as the synthesized user model response for the caller audio signal, in response to receiving a text to speech response from the response logic engine.

7. The computer-readable storage medium of claim 5, wherein the instructions further configure the computer to:
operate the speech synthesis model to generate listening response cues as the synthesized user model response for the caller audio signal, in response to receiving a non-verbal response from the response logic engine.

8. The computer-readable storage medium of claim 5, wherein the instructions further configure the computer to:
operate the speech synthesizer engine during a supervised training phase to:
receive call summary transcripts for a plurality of call session with the user model, the call summary transcripts comprising identified entities, call session intent, the sentiment score, and user model responses through the training interface of the response logic engine;
identify a response state and generate response options with certainty scores through operation of the response logic engine, in response to receiving a response audit from the user model; and
receive a feedback control from the user model responsive to the response state, the response options, and the certainty scores.

9. A computing apparatus, the computing apparatus comprising:
a processor; and
a memory storing instructions that, when executed by the processor, configure the apparatus to:
operate an audio interface to receive a caller audio signal during a call session;
generate an audio transcript comprising a sentiment score from the caller audio signal through operation of a sentiment analysis engine configured by a sentiment model;
communicate the audio transcript to a user interface switch configured to receive inputs from a user model;
communicate a response control from the user interface switch to a speech synthesizer engine trained with historical conversation data from the user model;
operate the speech synthesizer engine to:
generate a response signal for the caller audio signal and the audio transcript through operation of a response logic engine configured by the historical conversation data; and
generate a synthesized audio response comprising an ambient signal and a synthesized user model response from the response signal through operation of a speech synthesis model configured by the historical conversation data;
communicate the synthesized audio response responsive to the caller audio signal through the audio interface during the call session;
receive a user model input through the user interface switch from the user model, in response to the receiving the caller audio signal through the audio interface;
communicate a user model audio response, responsive to the caller audio signal, to the audio interface, the user model audio response comprising response audio and background noise;
store the audio transcript, the caller audio signal, and the user model audio response as the historical conversation data in a controlled memory data structure; and
operate the speech synthesis model to generate the ambient signal from the background noise of user model responses in the historical conversation data.

10. The computing apparatus of claim 9, wherein the instructions further configure the apparatus to:
operate the speech synthesis model to generate a synthesized speech as the synthesized user model response for the caller audio signal, in response to receiving a text to speech response from the response logic engine.

11. The computing apparatus of claim 9, wherein the instructions further configure the apparatus to:
operate the speech synthesis model to generate listening response cues as the synthesized user model response for the caller audio signal, in response to receiving a non-verbal response from the response logic engine.

12. The computing apparatus of claim 9, wherein the instructions further configure the apparatus to:

operate the speech synthesizer engine during a supervised training phase to:
  receive call summary transcripts for a plurality of call session with the user model, the call summary transcripts comprising identified entities, call session intent, the sentiment score, and user model responses through the training interface of the response logic engine;
  identify a response state and generate response options with certainty scores through operation of the response logic engine, in response to receiving a response audit from the user model; and
  receive a feedback control from the user model responsive to the response state, the response options, and the certainty scores.

* * * * *